March 12, 1929.  W. HENNING  1,704,744

FLYTRAP

Filed May 24, 1928

Inventor

Wm. Henning

By Hiram A. Sturges

Attorney

Patented Mar. 12, 1929.

1,704,744

UNITED STATES PATENT OFFICE.

WILLIAM HENNING, OF PERU, NEBRASKA.

FLYTRAP.

Application filed May 24, 1928. Serial No. 280,183.

This invention relates to a fly trap, and has for its object to provide a trap for the collection and destruction of house flies, the construction to be of such arrangement that it will operate to advantage when secured to the side of a screen door or window.

One of the specific objects of the invention is to provide a fly trap which will operate automatically for collecting the flies and may be kept clean and sanitary without any attention. Also another object is to provide a trap for these purposes which may be manufactured at a limited expense and will be effective in operation.

With these objects in view and others to be mentioned the invention presents a new and useful construction, combination and arrangement of parts as described herein and claimed, and as shown in the accompanying drawing, it being understood that changes may be made in form, size, proportion and minor details, said changes being determined by the scope of the invention as claimed.

Figure 1:
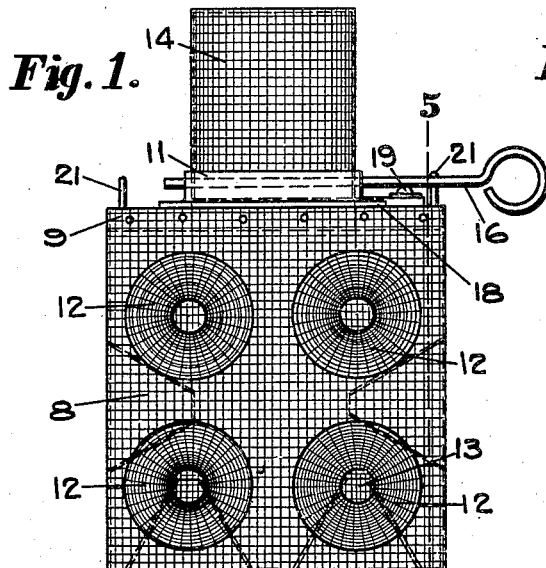
Figure 2:
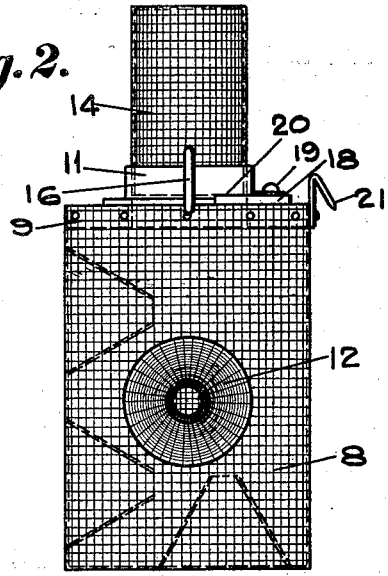
Figure 3:
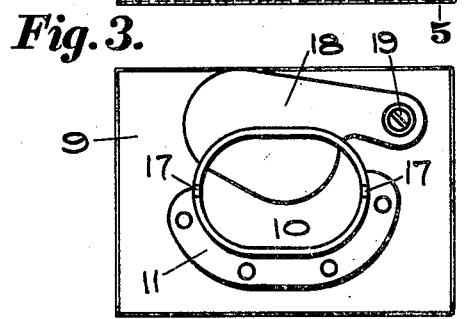
Figure 4:
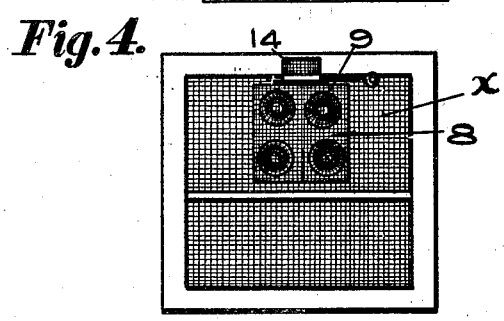
Figure 5:
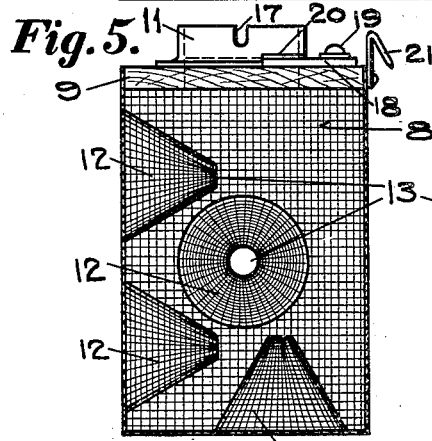
Figure 6:
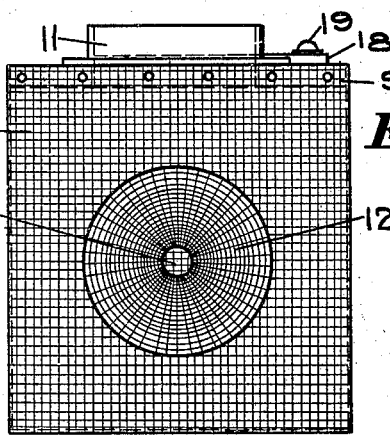
Figure 7:
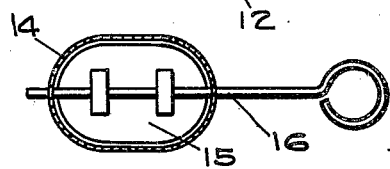

In the drawing: Fig. 1 is a front view of the fly trap. Fig. 2 is an end view of the same. Fig. 3 is a top plan view of the lower cage, a slide-plate being shown in partly closed position. Fig. 4 shows the fly trap mounted on a screen. Fig. 5 is a transverse section on line 5—5 of Fig. 1, the upper cage being omitted. Fig. 6 is a side view of a lower cage to illustrate a modified form of the invention. Fig. 7 is a bottom plan view of the upper cage to clearly show a rotatable closure-member or door.

Referring now to the drawing for a more particular description numeral 8 indicates a lower foraminous cage, its front, back, ends and bottom preferably being constructed of wire mesh, its top 9 being constructed of wood or sheet metal and having a passageway 10 and a collar or sleeve 11 disposed in register with said passageway. Numerals 12 indicate recesses or depressions formed in its walls, each terminating in an ingress-port 13 to permit entrance of flies to said lower cage. It is well known that flies assemble on the screens x of doors and windows, and the trap to be described, for its operation is secured upon the screen of the door or window, and they move into the lower cage 8 by passing through the apertures or passageways 13 of the depressions. While the depressions 12 are shown to have a cone-shaped form, this is not an important feature and I do not wish to limit myself to this form, nor to the number or size of the depressions.

I provide an upper cage 14 preferably constructed of wire mesh. It is closed at its top, and is provided near its open bottom with a closure-member consisting of a door 15 which is secured to a spindle or shaft 16, said shaft being journalled in the opposed walls of said upper cage, and it will be understood that the shaft 16 may be rotated for swinging this door to closed or open positions. Also the upper cage may be mounted upon the collar or sleeve 11 of the lower cage with its shaft or spindle engaging in the pair of opposed vertical slots 17 of said sleeve.

Numeral 18 indicates a slide-plate or closure-member for the lower cage, said plate being pivotally mounted as indicated at 19 and adapted to close the aperture 10, a horizontal slot 20 being provided for the sleeve 11 for receiving the slide-plate.

The modified form of the invention shows a single recess or depression 12' in the upright wall of the lower cage and I may use this construction if desired, the advantage being that it reduces the cost of manufacture. Numerals 21 indicate hooks for the lower cage, these hooks being used for attaching the trap to the screen. However any suitable fastening means may be used for this purpose.

It will be noted that the fly trap when mounted on a screen does not appreciably obstruct the light nor warm air-currents and, in operation the flies will move into the lower cage as described. At this time it is not necessary that the upper cage 14 be used, but if not used the slide-plate 18, of course, is moved to closed position.

In order that the lower cage may be kept in a sanitary condition the flies are collected in the upper cage. To accomplish this, a fabric jacket or cloth (not shown) is used for enclosing the lower cage. The slide-plate 18 and door 15 are moved to open position, and the flies, attracted by the light, will assemble in the upper cage. The door 15 is then swung to a closed position and upper cage removed and by boiling said upper cage and its contents, the flies may be destroyed. It will thus be seen that the upper cage will be sterilized and both cages may be maintained in a sanitary condition.

After the upper cage has been removed as last described, the jacket or cover which obstructed the light, is removed from the lower cage, the slide 18 is then moved to closed position and the operation may be repeated for exterminating the flies.

It will be understood that the spindle or shaft 16 extends entirely through the upper cage transversely thereof, and is above the lower end of said upper cage, so that its door 15 may have free swinging movements above the slide-plate 18, the slot 20 in which the plate 18 slides being disposed below the vertical slots 17 which receives the shaft or spindle 16.

It will be seen that the upper cage may be disposed at the inner side or outer side of the sleeve and in either instance the spindle or shaft 16 will engage in the vertical slots 17. In the present instance the upper cage is of such proportion that, when mounted on the lower cage, it fits snugly within said sleeve.

While the present invention has been described as a fly trap, it is obvious that it may be used for the extermination of gnats, bugs or similar pests, the wire mesh being changed so that they will be confined after entering the cages.

I claim as my invention,—

1. In a fly trap, a foraminous cage having depressions communicating with its interior and a passageway in its top, a slide-plate pivotally mounted upon and adapted to be reciprocated for closing and opening said passageway, a second foraminous cage having an open end for communicating with said passageway, and a rotatably mounted door within the second cage for controlling ingress or egress.

2. In a fly trap for a screen, a foraminous cage having depressions leading to its interior and a passageway opening on its top, a sleeve having a pair of opposed slots and disposed on the top of the cage in register with said passageway, a slide-plate for controlling said passageway, a second foraminous cage adapted to be mounted on the sleeve and having a rotatable shaft for engaging in the slots of said collar, and a door-member carried by the shaft.

3. In a fly trap for a screen, a cage having depressions leading to its interior and having fastening devices for a mounting on the screen and provided with a passageway opening on its top, a second cage having an open end communicating with said passageway, a door rotatably mounted in the second cage, and a slide arranged to be moved for closing said passageway.

4. In a fly trap for a screen, a cage arranged to be removably secured to the screen, and having depressions in its walls communicating with its interior, a second cage arranged to be mounted removably upon and to communicate with the first named cage, a door movable in the second cage, and a slide-member movable for closing said passageway.

5. In a fly trap for a screen, a foraminous cage having depressions communicating with its interior and a passageway opening on its top, means for securing the cage to the screen, and a second foraminous cage open at one of its ends arranged to be mounted on the top of the first named cage in communication with said passageway, a slide-member movable for closing said passageway, and a door member movable for closing the open end of the second cage.

6. In a fly trap for a screen door, a foraminous cage provided with depressions leading to its interior and having a passageway in its top, fastening devices for securing the cage in an upright position, a sleeve on the cage in register with said passageway having a horizontal slot in its side and vertical slots opening on its top, a slide-plate movable in the horizontal slot of the sleeve for closing said passageway, a second foraminous cage having an open end, a shaft journalled in the second cage and provided with a door-member and adapted to be rotated for closing the open end of the second cage, said last named cage being removably disposed in engagement with the sleeve, said shaft engaging in the vertical slots of the sleeve.

7. In a fly trap for a screen, a wire mesh cage having a depression leading therein and a passageway in its top, means to attach the cage in an upright position to the screen, a sleeve having a horizontal slot and vertical slots and disposed in register with said passageway, a movable slide-plate on the cage for engaging in the horizontal slot of the sleeve, a second wire mesh cage having an open end mounted on the sleeve, and a closure device including a rotatable shaft journalled in the second cage and adapted to be seated in the vertical slots of the sleeve and a door member movable with the shaft.

In testimony whereof, I have affixed my signature.

WILLIAM HENNING.